United States Patent [19]
Dyer et al.

[11] 3,820,437
[45] June 28, 1974

[54] TIP DRESSING TOOL

[75] Inventors: Rex H. Dyer, Independence, Mo.;
Lauren W. Burnett, Dubuque, Iowa

[73] Assignee: Dyer Weld Tool Corp., Lexington, Mo.

[22] Filed: Apr. 17, 1972

[21] Appl. No.: 244,369

[52] U.S. Cl. .................................. 90/12, 219/119
[51] Int. Cl. .......................................... B23c 1/20
[58] Field of Search ....... 408/22, 210, 216, 30, 118, 408/227; 30/347; 90/12; 219/119

[56] References Cited
UNITED STATES PATENTS
2,930,289 3/1960 Swarts..................................... 90/12
FOREIGN PATENTS OR APPLICATIONS
524,348 8/1940 Great Britain...................... 219/119

*Primary Examiner*—Donald R. Schran
*Assistant Examiner*—W. R. Briggs
*Attorney, Agent, or Firm*—Fishburn, Gold & Litman

[57] ABSTRACT

A tool for dressing the electrode tips of spot welding machines includes a body having an aperture therethrough and a handle extending radially from said aperture. A circular dressing head is removably and rotatably received within the aperture and includes peripheral teeth forming part of a ratchet permitting the dressing head to move only in one direction relative to the body. The dressing head contains inwardly projecting cutter members which are sustantially flat near the head center and increase in cutting attack angle radially outwardly so that the electrode tip is dressed while removing a minimum of material therefrom.

1 Claim, 6 Drawing Figures

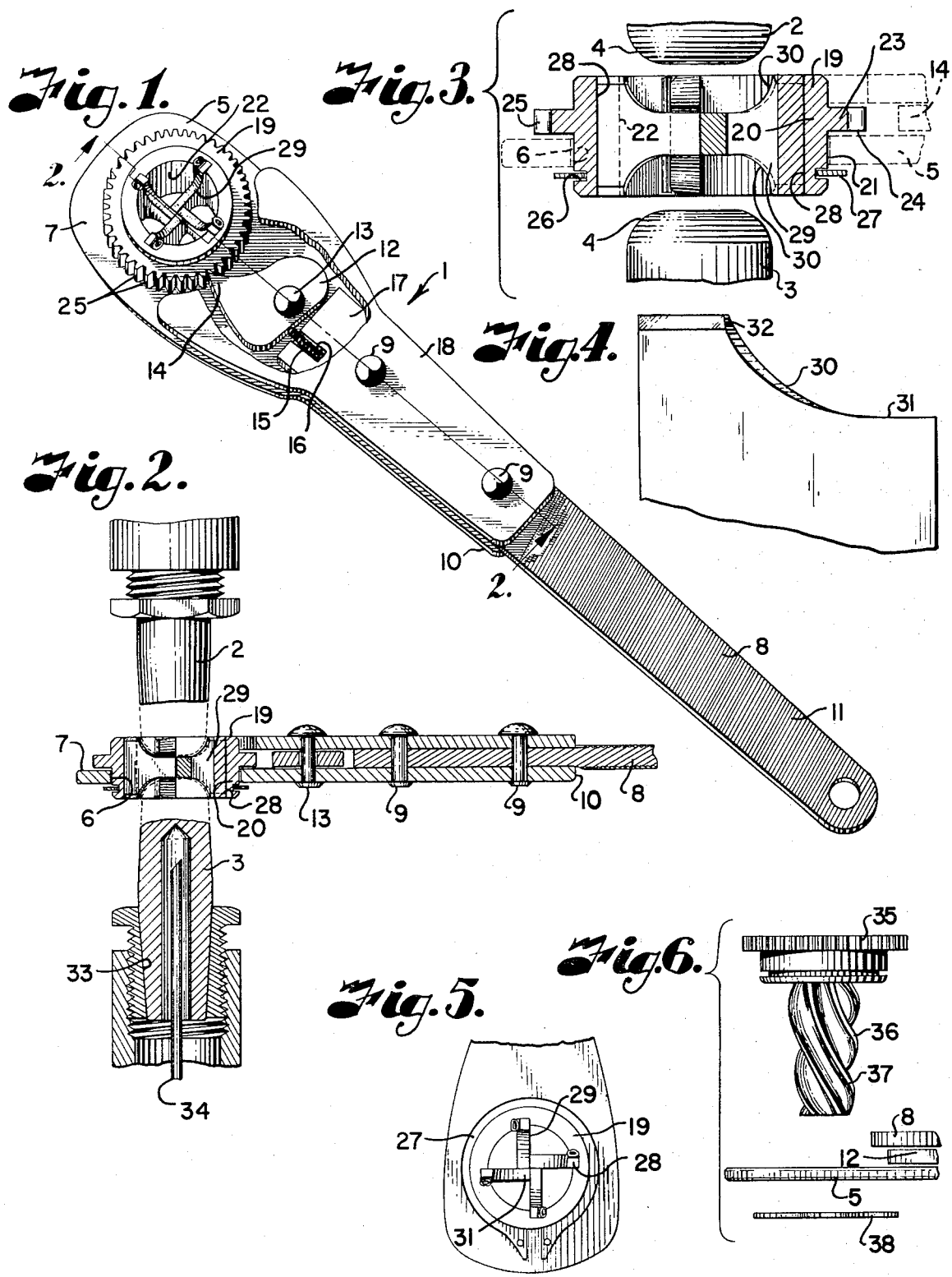

TIP DRESSING TOOL

This invention relates to resistance spot welding and more particularly to a tool for dressing the tips of opposed spot welding electrodes while operably mounted.

The electrodes of resistance spot welders are usually constructed of copper or copper alloy and rounded or bluntly pointed at the work engaging ends. During use, the work engaging ends become deformed or distorted and require dressing to restore the desired contour or shape.

Electrode tip trimming devices of various types are known, however, such previous devices have been found to be excessively complex and expensive, difficult to use, unreliable in operation, and/or short lived. A further disadvantage of previous dressing devices has been the tendency to remove excessive material from the tip, thus substantially shortening the life of the electrode.

The principal objects of the present invention are: to provide an improved tool for quickly, simply and easily trimming or dressing such electrodes while removing a minimum quantity of material therefrom; to provide such a tool which is inexpensive, long lived and reliable in use; and to provide such a device which is also useful in dressing the sockets which receive the electrodes.

Other objects and advantages of this invention will become apparent from the following description taken in connection with the accompanying drawings wherein are set forth by way of illustration and example certain embodiments of this invention.

FIG. 1 is a perspective view of a tip dressing tool embodying this invention, with a portion broken away to show ratchet construction.

FIG. 2 is a fragmentary cross-sectional view taken on the line 2—2, FIG. 1, and further showing the tool positioned between opposed electrodes.

FIG. 3 is a fragmentary side elevation on an enlarged scale showing the tool dressing head positioned between aligned electrode tips.

FIG. 4 is a fragmentary perspective view on a further enlarged scale illustrating the varying cutting angle contour of the dressing head cutter members.

FIG. 5 is a fragmentary plan view particularly showing the opposed face of the tool from that illustrated in FIG. 1.

FIG. 6 is a fragmentary exploded view in side elevation illustrating the association of a modified type of dressing head with the tool body for socket dressing operation.

Referring to the drawings in more detail:

The reference numeral 1 generally indicates a tool for dressing axially aligned spot welding electrodes 2 and 3 of a typical spot welding machine (not shown). The use of the tool 1 forms predetermined tip contours 4 on the tips 2 and 3 while removing a minimum of material, as described below.

The tool 1 comprises a flat body 5 of somewhat elongated configuration having an aperture 6 extending therethrough near one end 7 thereof. A handle 8 is secured to the body 5, in this example, by means of rivets 9 and extends radially from the aperture 6 in overlapping relation across the other end 10 of the body and therebeyond. In the illustrated form, the handle 8 has file ridges 11 thereon, providing a handy file surface for removing remaining burrs and the like from the electrodes, as needed.

A ratchet pawl 12 is mounted on the body 5 by means of a rivet 13 for pivotal movement in a plane adjacent and parallel to said body. The pawl 12 has a point 14 positioned adjacent the aperture 6. A spring 15 is received into a socket 16 formed in the end 17 of the handle 8 and bears against the pawl 12 to resiliently urge the point 14 toward the aperture 6. A handle cover 18 sandwiches the handle 8 between itself and the body 5 and is secured in position by means of the rivets 9 and 13. The handle cover 18 also functions to enclose the socket 16 containing the spring 15, however, it does not extend so far as to block the aperture 6.

A dressing head 19 is removably and rotatably received into the aperture 6 and includes a sleeve 20 (FIG. 3) having an outside surface 21 and an inside cylindrical surface 22. The sleeve 20 is of greater axial length than the thickness of the body 5 and of lesser outside diameter than the diameter of the aperture 6 whereby it is easily received thereinto. An integral flange 23 projects radially outwardly from the sleeve outside surface 21 and is of greater diameter than the aperture 6, thus preventing the dressing head 19 from moving therethrough and providing a bearing surface 24 for slidably engaging the body 5. The flange 23 has peripheral teeth 25 successively engagable with the pawl point 14 upon rotation of the dressing head 19 with respect to the body 5, thus permitting the head to rotate only in one direction. A circular groove 26, parallel to the flange 23, extends into the sleeve outside surface 21 and is spaced from the flange bearing surface 24 a distance greater than the thickness of the body 5. A retaining ring 27 is received in the groove 26, thereby retaining the dressing head assembled with the body 5, but permitting rotation thereof within the aperture 6. It is to be understood that the retaining ring 27 may be easily removed from the groove 26 by well known methods, permitting the dressing head to be quickly disassembled from the tool body 5, as desired.

A plurality, in this example four, circumferentially spaced, axially directed, interior grooves 28 are formed in the sleeve inside surface 22. A cutter members 29 is mounted in each of the respective interior grooves 28 and projects inwardly into centrally adjacent relation with other cutter members 29. The cutter members 29 have opposed, concave electrode tip cutting or dressing edges 30 of substantially flat (burnishing) configurations centrally of said aperture at 31, and increasing in rake or cutting attack angle radially outwardly thereof to the peripheral cutting limit at 32.

Thus, inserting the opposed electrodes 2 and 3 under pressure into the aperture 6, and rotating the dressing head by reciprocally cranking the handle 8 in a plane transverse to the axis of the electrodes, causes rapid cutting or dressing of the tip only as required to obtain the desired tip contour 4. In other words, the abutment between the flat portions of the cutter members and the tip center acts as a feeding stop to prevent the removal of excess material.

It is sometimes necessary to dress the welding machine arm sockets 33 for securely receiving electrode tips, in order that circulating water provided by internal nozzles 34 will not leak into the work area. To accomplish this, the dressing head 19 is removed and replaced with a socket dressing head 35. The head 35 is similar in construction to the head 19, except that the cutter members 29 are replaced by a spiralled, tapered reamer 36 sized to dress the socket 33. The reamer 36 is spiralled in a direction which urges the flutes 37 to back out of the socket 33 upon rotation in the direction permitted by the tool to avoid "grabbing" which might damage the interior surface contacted. A retaining ring 38, similar to the ring 27, removably retains the modified dressing head 35 in operable position.

It is to be understood that although certain forms of this invention have been illustrated and described it is not to be limited thereto except insofar as such limitations are included in the following claims.

What is claimed and desired to be secured by Letters Patent is:

1. In a tool for forming tip contours on spot welding electrode tips:

a. a rotatable support having a bore for receiving said tips;
b. individual cutter bar members having spaced apart inner and outer ends, said inner ends projecting to the center of said bore, said outer ends being secured in said support; and
c. tip contacting cutting edges on said cutter members and varying from a substantially noncutting feeding stop and burnishing configuration near said center to a cutting configuration radially outwardly therefrom toward said outer ends;
d. said cutter members being circumferentially spaced apart radially outwardly of said center whereby tip cuttings may drop through said bore.

* * * * *